US008353380B2

(12) United States Patent  
Schönberger et al.

(10) Patent No.: US 8,353,380 B2  
(45) Date of Patent: *Jan. 15, 2013

(54) DEFLECTOR DEVICE FOR PARTIALLY OVERLAPPING FRONTAL COLLISION OF MOTOR VEHICLES

(75) Inventors: Gerhard Schönberger, Raaba (AT); Wilhelm Breitenhuber, Klagenfurt (AT); Wolfgang Schimpl, Grieskirchen (AT); Arno Eichberger, St. Radegung (AT); Friedrich Pernkopf, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 878 days.

This patent is subject to a terminal disclaimer.

(21) Appl. No.: 11/816,728

(22) PCT Filed: Feb. 21, 2006

(86) PCT No.: PCT/AT2006/000068  
§ 371 (c)(1),  
(2), (4) Date: Feb. 26, 2010

(87) PCT Pub. No.: WO2006/086818  
PCT Pub. Date: Aug. 24, 2006

(65) Prior Publication Data  
US 2010/0140965 A1 Jun. 10, 2010

(30) Foreign Application Priority Data  
Feb. 21, 2005 (AT) .................... GM94/2005

(51) Int. Cl.  
*B60R 19/00* (2006.01)

(52) U.S. Cl. ............ 180/274; 296/187.1; 293/114; 293/150

(58) Field of Classification Search ............ 280/784; 180/274, 311; 296/187.1; 293/21, 114, 132, 293/141, 149, 150  
See application file for complete search history.

(56) References Cited

U.S. PATENT DOCUMENTS

| 2,508,836 | A  | * | 5/1950  | Morris .................... 293/135 |
| 2,519,429 | A  | * | 8/1950  | Brandvold ................ 293/143 |
| 6,764,118 | B2 | * | 7/2004  | DePottey et al. ........... 293/118 |
| 6,926,322 | B2 | * | 8/2005  | Browne et al. ............. 293/114 |
| 6,942,261 | B2 | * | 9/2005  | Larsen et al. ............. 293/107 |
| 7,819,218 | B2 | * | 10/2010 | Eichberger et al. ......... 180/274 |
| 2002/0121788 | A1 |  | 9/2002 | Zeppetzauer |
| 2005/0110284 | A1 | * | 5/2005 | Browne et al. ............. 293/118 |

FOREIGN PATENT DOCUMENTS

| GB | 2 336 811   | 11/1999 |
| JP | 2004-306871 | 11/2004 |
| WO | 2005/110815 | 11/2005 |

* cited by examiner

*Primary Examiner* — Paul N Dickson  
*Assistant Examiner* — Timothy Wilhelm  
(74) *Attorney, Agent, or Firm* — Bachman & LaPointe, P.C.

(57) ABSTRACT

Deflecting device for an offset frontal collision for motor vehicles, the front end of which motor vehicles has a left and a right longitudinal member (2, 3), and the deflecting device being arranged in front of a front wheel (6) and protecting the front wheel in the event of a collision. In order to reliably bring about an engagement embracing the front wheel (6) with minimal structural expenditure, the deflecting device is composed of a jib (12), which is fastened to the front end of the vehicle, and a shield (13) which is moveable on said jib (12) outward transversely with respect to the direction of travel, with the jib (12) extending in front of the wheel (6) substantially transversely with respect to the direction of travel and having a guide (14) for the shield (13) and a force source (15) for moving the shield (13).

8 Claims, 3 Drawing Sheets

DEFLECTOR DEVICE FOR PARTIALLY OVERLAPPING FRONTAL COLLISION OF MOTOR VEHICLES

BACKGROUND OF THE INVENTION

The invention relates to a deflecting device for an offset frontal collision for motor vehicles, the front end of which vehicles has a left and a right longitudinal member, the deflecting device being arranged in front of a front wheel and protecting the front wheel in the event of a collision. An offset frontal collision is to be understood to mean a frontal collision in which the colliding vehicles move toward each other with directional vectors which are substantially parallel but are offset laterally in relation to one another. The collision zone is therefore only a lateral part of the front end of the vehicle.

In vehicles, this lateral part of the front end of the vehicle in front of the passenger compartment is usually less rigid than the central part in front of the passenger compartment and also absorbs less collision energy, resulting in considerable deformations of the passenger compartment. In particular, there is the risk of the respective wheel penetrating the passenger compartment. Furthermore, in the case of collisions of this type, a particularly hazardous phenomenon generally also occurs: even in the event of a relatively small offset, the collision-side front wheels of the two vehicles become interlocked; one wheel at least of the one vehicle collides with the wheel suspension of the other. As a result, the wheels are not only subject to particularly severe longitudinal forces which push them into the passenger compartment, but the two vehicles are connected at least partially to each other in an interlocking manner and are thus prevented from passing each other by. In addition, the two interlocked vehicles are also jointly caused to twist about the vertical axis.

This phenomenon is known in the literature under the term "interlocking". DE 195 32 858 A1 discloses, as a countermeasure, designing the front fender to be greatly rounded in the side region in plan view, and to be sufficiently rigid that it prevents the collision-side front wheels from coming into contact and causes the two vehicles to pass each other by. It is conceivable that the fender may never be strong enough for this purpose at the collision speeds customary nowadays. In addition, the fender also has to satisfy other safety requirements which run counter to this: a collision surface which is as wide as possible for an entirely overlapping offset frontal collision and apportioned yielding in the event of a collision with a pedestrian.

U.S. Pat. No. 5,275,436 furthermore discloses providing, in front of and behind the front wheels, approximately vertical deflecting plates which are aligned and curved in the horizontal in such a manner that they positively pivot the wheel inward in the event of a collision. However, these deflecting plates are also constructed in a very heavy manner if they are actually to have this effect, and they likewise require a particularly heavy bumper involving the above-mentioned disadvantages. However, above all, the effect of the front deflecting plate is inadequate for kinematic reasons: if it is arranged at a sufficient distance in front of the wheel and does not extend over the outer vertical boundary surface of the wheel, its outer end pivots inward on a circular arc. It then touches the wheel within its outer vertical boundary surface and can no longer grasp it and pivot it inward. On the contrary, it destroys the wheel and the deflecting action does not occur.

JP 2004-306871 A discloses a protective device for absorbing the collision energy in an offset frontal collision, which protective device is composed of side parts which are guided at both sides in the fender. The side parts are circular-arc-shaped and, in the event of an impending collision, are pulled out of the fender by an electric motor which is arranged in the center point of the curvature of the side parts. In the position which is reached in this way, said side parts project outward beyond the associated front wheel, but without acting on the latter.

Furthermore, it is proposed in the older patent application US 2005/0110284 A1, which was published after the priority date of the present patent application (on May 26, 2005), to provide the fender of a motor vehicle with outwardly moveable elements for the purpose of absorbing the collision energy. Said publication gives no details regarding the type of collision and an interaction with the wheels.

SUMMARY OF THE INVENTION

The invention is based on the object of reliably bringing about an engagement embracing the front wheel concerned in order to deflect the impact directed from a colliding vehicle away from the front wheel concerned, and to do this with a minimal outlay on construction.

According to the invention, this is achieved in that it is composed of a jib, which is fastened to the front end of the vehicle, and a shield which is moveable on said jib outward transversely with respect to the direction of travel, with the jib extending in front of the wheel substantially transversely with respect to the direction of travel and having a guide for the shield and a force source for moving the shield (13) outward, and in that the jib (11) is fastened, so as to be pivotable about a vertical axis (33), to the longitudinal member (2) in such a way that, in the event of a collision, said jib (11) is pivoted (arrow 20) in the direction of the respective wheel (6), so that the shield (13**) which has been moved outward embraces the wheel (6) and pivots it into the position (6*), in which the wheel (6) itself also deflects the collision counterpart. Here, the jib and the shield can be kept so short in the vehicle transverse direction that they (as viewed from above) need not project outward beyond the wheel, because only in the event of a collision is the shield moved so far outward that it engages around the respective wheel and thus deflects the collision counterpart. The deflecting device is thus composed of only two simple components and can be planned into an existing vehicle body without significant structural modifications.

In one preferred embodiment, the guide is composed of two parallel tubes, which form the jib, and at least one bracket which is fastened to the shield, with the at least one bracket being attached to that side of the shield which faces toward the wheel. This is particularly cheap and simple to produce. The force source is then preferably arranged between the two tubes, with one end of the force source engaging on the bracket and the other end of said force source engaging on the jib. As a result of the force engagement being symmetrical with regard to the guides, the movement takes place with minimal friction and without the possibility of jamming as a result of misalignment.

The two tubes advantageously have a common foot which is fastened to the respective longitudinal member. The jib can be fixedly connected to the front end of the vehicle, in particular to the longitudinal member, by means of said foot, and said jib will then bend in the event of a collision. The expenditure for a rigid connection is not worthwhile in most cases. One particularly light and functional construction is characterized in that the foot is fastened to the longitudinal member, so as to be pivotable about a vertical axis, in such a way that said foot is pivoted towards the respective wheel only when a certain collision force acts.

The force source is either a pressure spring or a pyrotechnic charge. In addition, the shield can have stiffening ribs.

BRIEF DESCRIPTION OF THE DRAWINGS

The invention is described and explained below with reference to figures which depict the following.

DETAILED DESCRIPTION

Figure 1:
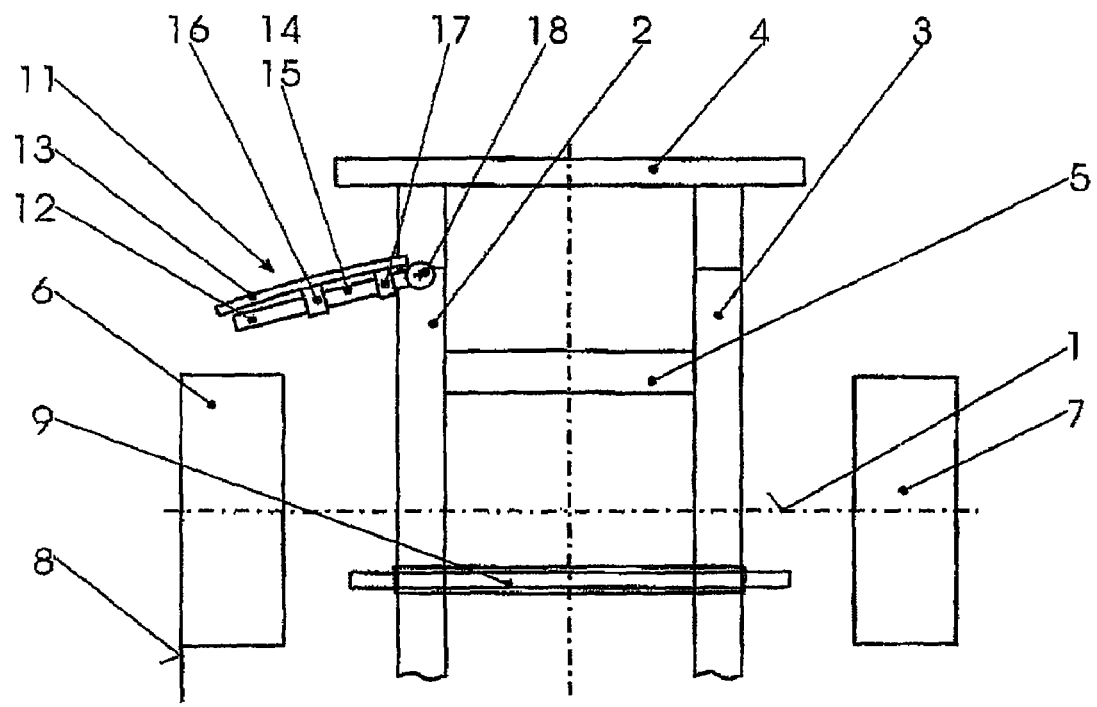
FIG. 1: a schematic diagram of a device according to the invention in the inoperative position.

In FIG. 1, the front end of a motor vehicle is indicated only by means of its two longitudinal members 2, 3, a fender support 4, a cross member 5 and the center line 1 of the front axle. In the following text, only the left side with the left front wheel 6 and the left longitudinal member 2 is described; however, the same however also applies to the right side of the vehicle with the right front wheel 7 and the right longitudinal member 3. Furthermore, the steering mechanism 9 of a rack and pinion steering system, which steering mechanism is arranged behind the front axle, is also indicated.

A deflecting device 11 according to the invention is situated in front of the left front wheel 6 whose outer vertical boundary surface is denoted by 8. The deflecting device 11 is composed of a jib 12 and a shield 13 which is guided in a moveable fashion on the jib. The jib 12 forms a guide 14 for brackets 16, 17 of the shield 13 and contains a force source 15. The jib has a foot 18 which is fastened to the longitudinal member 2.

Figure 2:
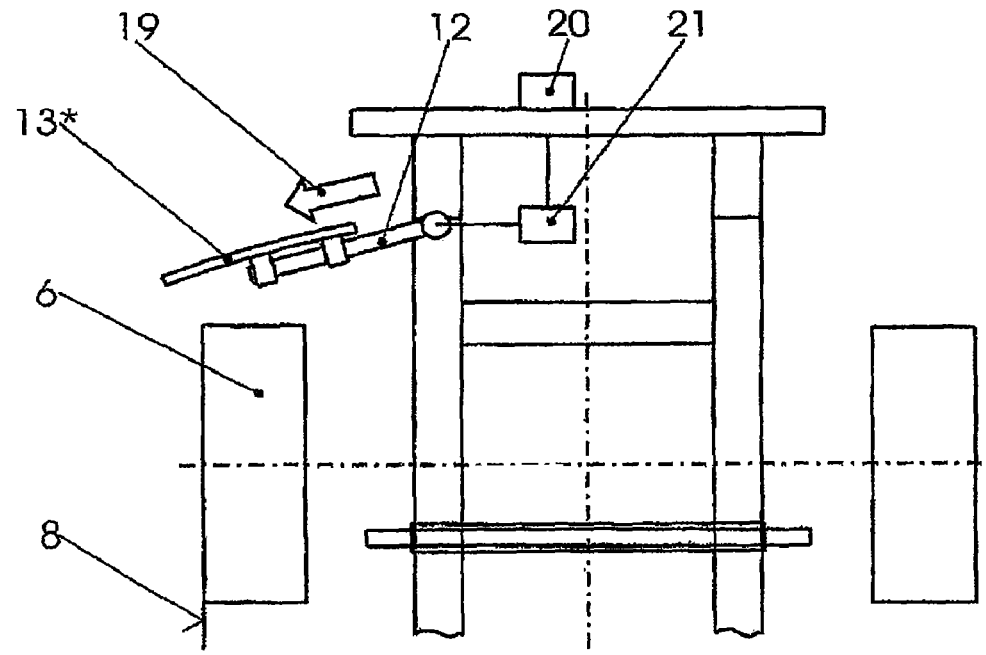
FIG. 2: as FIG. 1, in a first operating position.

FIG. 2 shows the device shortly before or at a very early stage of an offset frontal collision. A sensor 20 is primarily a proximity sensor or secondarily a collision sensor which, via a control unit 21, activates the force source 15. This has already occurred in FIG. 2; the shield 13 has already been pushed outward by the force source 15 in the direction of the arrow 19 and placed into the position 13*. In this position, said shield 13 projects laterally beyond the front wheel 6 and thus deflects the collision counterpart outward away from the wheel 6.

Figure 3:
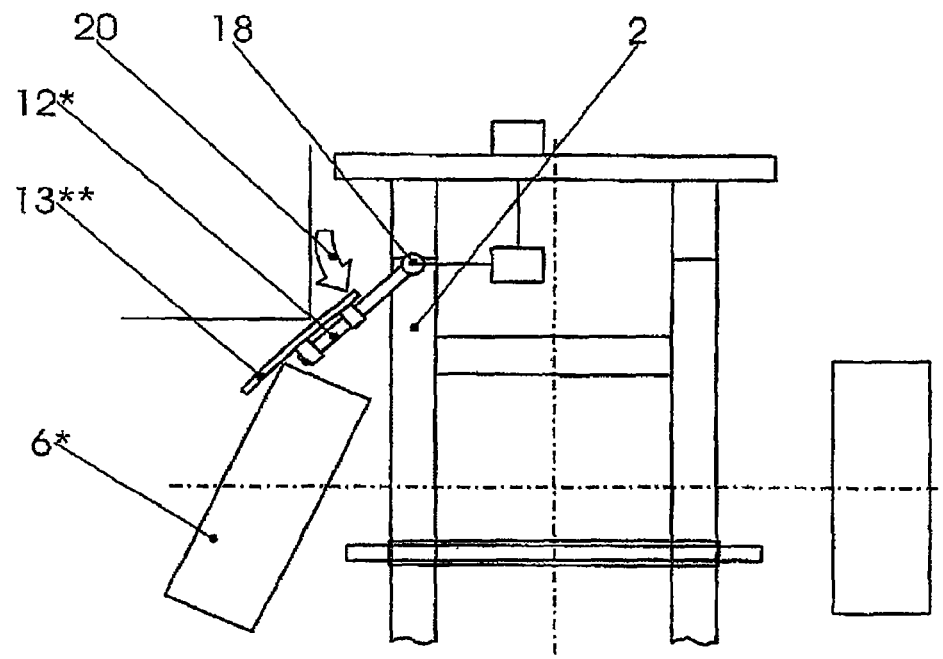
FIG. 3: as FIG. 1, in a further operating position.

FIG. 3 shows for example a later stage of the collision which is not reached in all cases. In this stage, the jib 12 has been pivoted, as indicated by the arrow 20, counterclockwise. This can have taken place as a result of bending or as a result of rotation of the foot relative to the longitudinal member 2. In the latter case, the connection between the foot 18 and the longitudinal member 2 is designed such that the rotation takes place only above a certain impact force. In this phase of the collision, the shield 13 which has been moved outward, referred to henceforth as 13, has not only embraced the wheel 6 but has also pivoted it into the position 6*, so that now the wheel 6*** itself also deflects the collision counterpart. The wheel can however also be moved and/or deformed in some other way; it is essential that it is embraced by the jib.

Figure 4:
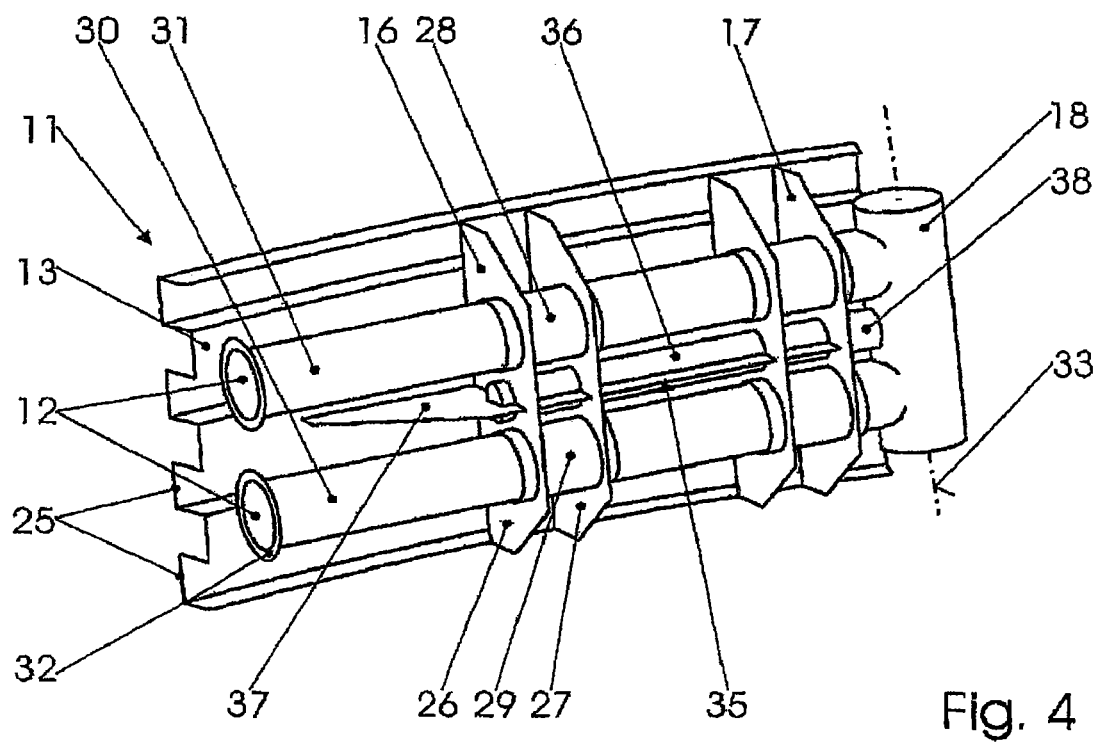
FIG. 4: a preferred embodiment of the device according to the invention in the inoperative position.
Figure 5:
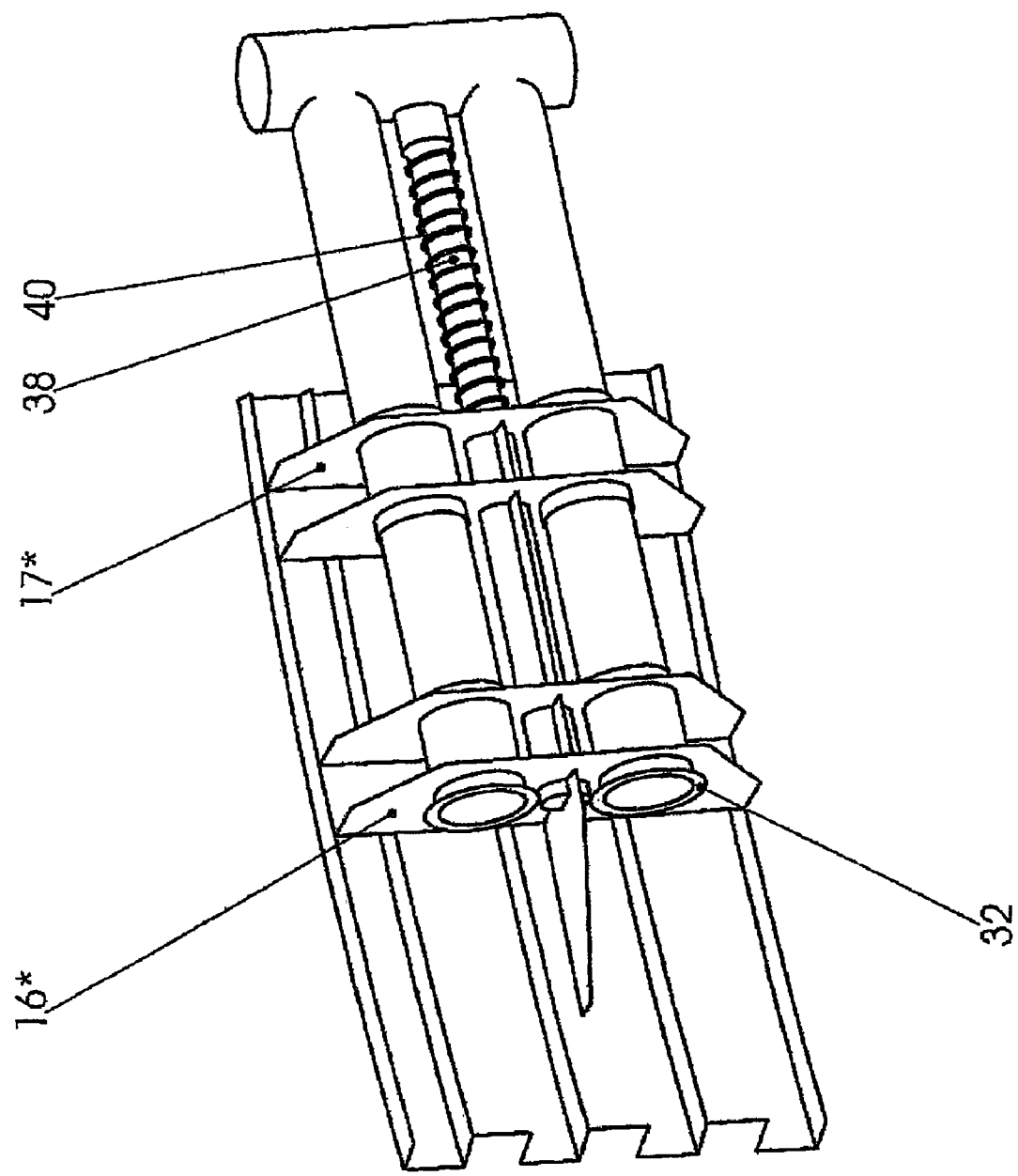
FIG. 5: as FIG. 4, in the event of a collision.

FIG. 4 and FIG. 5 show the deflecting device 11 in detail, the former in the inoperative position, and the latter in the position corresponding to FIG. 2. The shield 13 is a plate which, for stiffness reasons, is slightly curved and is provided with stiffening ribs 25 which are arranged in the vehicle transverse direction. Fastened to said shield 13 are two brackets 16, 17. Each bracket 16, 17 is composed of two web plates 26, 27 which hold in each case two guide sleeves 28, 29. The guide sleeves 28, 29 of the two brackets 16, 17 surround two parallel guide tubes 30, 31 which form the jib 12. Said guide tubes 30, 31 have end stops 32 at their outer ends and are connected at their inner ends to the foot 18. Here, said foot 18 is pivotable about a vertical axis 33, with it being ensured that the pivoting movement can begin only when the impact force has exceeded a certain magnitude. The cross section of the guide tubes 30, 31 can be circular or of some other shape.

In addition, a casing 36 of the force source 35 is fastened in the two brackets 16, 17, between the two guide tubes 30, 31. For improved force introduction into the shield 13, the casing 36 is connected, for example welded, over its entire length to the shield 13 by means of a ridge 37. It is possible in FIG. 4 to see a small piece of a rod 38 which is fixedly connected to the foot 18. Situated in the interior of said rod 38 is a piston-shaped body (not visible). If the force source 35 is triggered or acted on, then it causes a movement of the casing 36 with respect to the foot 38, as can be seen in FIG. 5. It can be seen that the force source here is a strong pressure spring 40 which pushes the casing 36 outward when the latter is released as a result of the action of the control unit on a locking mechanism (not illustrated). The force source could however also be a pyrotechnic charge. A suitable explosive charge is then situated in the casing 36, which explosive charge is triggered by an electric signal from the control unit 21.

The invention claimed is:

1. In a motor vehicle, a deflecting device for an offset frontal collision for the motor vehicle, the motor vehicle comprising front end having a left and a right longitudinal member (2, 3), the deflecting device (11) is arranged in front of a front wheel (6) of the motor vehicle and protects the front wheel in the event of a collision, wherein the deflecting device comprises a jib (12) fastened to the front end of the vehicle and a shield (13) which is moveable on the jib (12) outward transversely with respect to normal direction of travel of the motor vehicle, the jib (12) extends in front of the wheel (6) substantially transversely with respect to the normal direction of travel and has a guide (14) for the shield (13) and a force source (15) for moving the shield (13) outward, the jib (11) is fastened by means for providing the jib with pivotable movement about a vertical axis (33) in such a way that, in the event of a collision, the jib (11) is pivoted in the direction of the respective wheel (6), so that the shield (13) which is moved outward embraces the wheel (6) and pivots it into the position (6*) where the wheel (6**) itself also deflects the collision counterpart.

2. Deflecting device according to claim 1, wherein the guide (14) comprises two parallel tubes (30, 31) and at least one bracket (16, 17) which is fastened to the shield (13), the at least one bracket (16, 17) is attached to a side of the shield (13) which faces toward the wheel (6).

3. Deflecting device according to claim 2, wherein the force source (15) is arranged between the two tubes (30, 31), one end of the force source (15) engages on the bracket (16) and an other end of the force source (15) engages on the jib (12).

4. Deflecting device according to claim 3, wherein the two tubes (30, 31) have a common foot (18) which is fastened to a respective longitudinal member (2).

5. Deflecting device according to claim 4, wherein the common foot (18) is fastened to the longitudinal member (2) so as to be pivotable about a vertical axis (33) in such a way that the common foot (18) is pivoted towards the respective wheel (6) only when a certain collision force acts.

6. Deflecting device according to claim 1, wherein the force source (15) comprises a pressure spring.

7. Deflecting device according to claim 1, wherein the force source (15) comprises a pyrotechnic charge.

8. Deflecting device according to claim 1, wherein the shield (13) has stiffening ribs (25).

* * * * *